United States Patent
Kumazawa et al.

(10) Patent No.: US 7,764,696 B2
(45) Date of Patent: Jul. 27, 2010

(54) ROUTING CONTROL METHOD, ROUTER, AND TERMINAL

(75) Inventors: Masayuki Kumazawa, Yokohama (JP); Taisuke Matsumoto, Yokohama (JP); Shinkichi Ikeda, Yokohama (JP); Hirokazu Kobayashi, Inagi (JP); Makoto Funabiki, Yokohama (JP); Toyoki Kawahara, Chofu (JP)

(73) Assignee: Panasonic Corporation, Osaka (JP)

( * ) Notice: Subject to any disclaimer, the term of this patent is extended or adjusted under 35 U.S.C. 154(b) by 943 days.

(21) Appl. No.: 10/541,525

(22) PCT Filed: Apr. 14, 2004

(86) PCT No.: PCT/JP2004/005292

§ 371 (c)(1), (2), (4) Date: May 23, 2006

(87) PCT Pub. No.: WO2004/093397

PCT Pub. Date: Oct. 28, 2004

(65) Prior Publication Data

US 2006/0248369 A1    Nov. 2, 2006

(30) Foreign Application Priority Data

Apr. 15, 2003    (JP)    ............... 2003-110118
Apr. 12, 2004    (JP)    ............... 2004-116404

(51) Int. Cl.
H04L 12/28    (2006.01)
(52) U.S. Cl. ............. 370/401; 370/16.85; 370/85.14; 370/227; 370/392; 370/428
(58) Field of Classification Search ............ 370/16, 370/85.13, 85.14, 227, 328, 392, 401, 428, 370/465, 466, 469
See application file for complete search history.

(56) References Cited

U.S. PATENT DOCUMENTS 5,088,091 A * 2/1992 Schroeder et al. ............ 370/406
5,457,683 A * 10/1995 Robins ........................ 370/258
5,473,599 A * 12/1995 Li et al. ...................... 370/219

(Continued)

FOREIGN PATENT DOCUMENTS

EP    04 72 7379    2/2010

(Continued)

OTHER PUBLICATIONS

Research of Seamless Handover Method for Moving Network, Taisuke Matsumoto et al., Technical Report of IEICE, NS2002-323, IN2002-296, Mar. 2003, pp. 327-330.

(Continued)

*Primary Examiner*—Ayaz R Sheikh
*Assistant Examiner*—Andrew C Lee
(74) *Attorney, Agent, or Firm*—RatnerPrestia

(57) ABSTRACT

When the routing function of router becomes disabled, a routing stop message is multicast to all terminals and another router in a LAN. If another router can provide the routing function, a routing start message is multicast to all terminals and the other router in the LAN. This method allows the terminals in the LAN to switch the default router at a predetermined timing according to both messages, thus minimizing the default router switching delay time and the packet loss.

14 Claims, 12 Drawing Sheets

U.S. PATENT DOCUMENTS

| | | | |
|---|---|---|---|
| 5,751,955 A * | 5/1998 | Sonnier et al. | 714/12 |
| 5,778,187 A * | 7/1998 | Monteiro et al. | 709/231 |
| 6,148,410 A * | 11/2000 | Baskey et al. | 714/4 |
| 6,148,411 A * | 11/2000 | Ichinohe et al. | 714/4 |
| 6,192,029 B1 * | 2/2001 | Averbuch et al. | 370/229 |
| 6,195,705 B1 * | 2/2001 | Leung | 709/245 |
| 6,327,243 B1 * | 12/2001 | Gregorat | 370/218 |
| 6,457,138 B1 * | 9/2002 | Lesser et al. | 714/1 |
| 6,556,547 B1 * | 4/2003 | Srikanth et al. | 370/317 |
| 6,751,188 B1 * | 6/2004 | Medved et al. | 370/216 |
| 6,826,154 B2 * | 11/2004 | Subbiah et al. | 370/236 |
| 6,865,591 B1 * | 3/2005 | Garg et al. | 709/201 |
| 6,910,148 B1 * | 6/2005 | Ho et al. | 714/4 |
| 6,954,436 B1 * | 10/2005 | Yip et al. | 370/254 |
| 7,092,354 B2 * | 8/2006 | Jensen | 370/218 |
| 7,099,326 B2 * | 8/2006 | Flinck et al. | 370/392 |
| 7,200,114 B1 * | 4/2007 | Tse-Au | 370/231 |
| 7,269,133 B2 * | 9/2007 | Lu et al. | 370/219 |
| 7,292,535 B2 * | 11/2007 | Folkes et al. | 370/238 |
| 7,406,030 B1 * | 7/2008 | Rijsman | 370/216 |
| 7,406,035 B2 * | 7/2008 | Harvey et al. | 370/218 |
| 7,421,612 B1 * | 9/2008 | Maranhao et al. | 714/4 |
| 7,486,610 B1 * | 2/2009 | Bhupalam et al. | 370/216 |
| 7,490,161 B2 * | 2/2009 | Ren | 709/238 |
| 2002/0078232 A1 * | 6/2002 | Simpson et al. | 709/238 |
| 2002/0176355 A1 * | 11/2002 | Mimms et al. | 370/216 |
| 2002/0184387 A1 * | 12/2002 | Yamaya et al. | 709/238 |
| 2003/0037165 A1 | 2/2003 | Shinomiya | |
| 2003/0069990 A1 * | 4/2003 | D'Annunzio et al. | 709/242 |
| 2004/0160825 A1 * | 8/2004 | Bhattacharyya | 365/185.08 |
| 2005/0157741 A1 * | 7/2005 | Wu et al. | 370/432 |

FOREIGN PATENT DOCUMENTS

| | | |
|---|---|---|
| JP | 10-173706 A | 6/1998 |
| JP | 11-88353 A | 3/1999 |
| JP | 11-088353 A | 3/1999 |
| JP | 11-261561 | 9/1999 |
| JP | 2003-46539 A | 2/2003 |
| JP | 2003-046539 A | 2/2003 |
| JP | 2003-258843 A | 9/2003 |

OTHER PUBLICATIONS

Neighbor Discovery for IP Version 6 (IPv6), T. Narten, et al., Dec. 1998, pp. 1-93.

International Search Report for application No. PCT/JP2004/005292 dated Jul. 20, 2004.

Shimazu Tadatsugu, "Each broadband router which mulitple PC connect with CATV/ADSL by is difference on security function.", NIKKEI Communications, Dec. 4, 2000, vol. 331 pp. 122-123, with English translation.

Shimazu et al., "(Broad-band router), Connection between PCs via CATV/ADSL production difference between security function," NIKKEI Communications, Dec. 4, 2000, vol. 331, pp. 118-123, with partial English translation.

S. Knight, et al., "Virtual Router Redundancy Protocol", Network Working Group, Request for Comments: 2338, Category: Standards Track, XP-002135272, Apr. 1, 1998, pp. 1-27.

* cited by examiner

FIG.11

| ENTRY | ROUTER LIFETIME RL (unit: sec) | NEIGHBOUR CACHE POINTER |
|---|---|---|
| ROUTER 1 | 0 | N1 |
| ROUTER 2 | 3000 | N2 |

FIG.12

| ENTRY | ROUTER LIFETIME RL (unit: sec) | NEIGHBOUR CACHE POINTER |
|---|---|---|
| ROUTER 2 | 2999 | N2 |

FIG.13

| ENTRY | IP ADDRESS (LAN INTERFACE) | TRANSITION TIME (unit: msec) | LINK-LAYER ADDRESS |
|---|---|---|---|
| N1 | IPAddr1 | 0 | MAC1 |
| N2 | IPAddr2 | 300 | MAC2 |

1301  1302  1303  1304

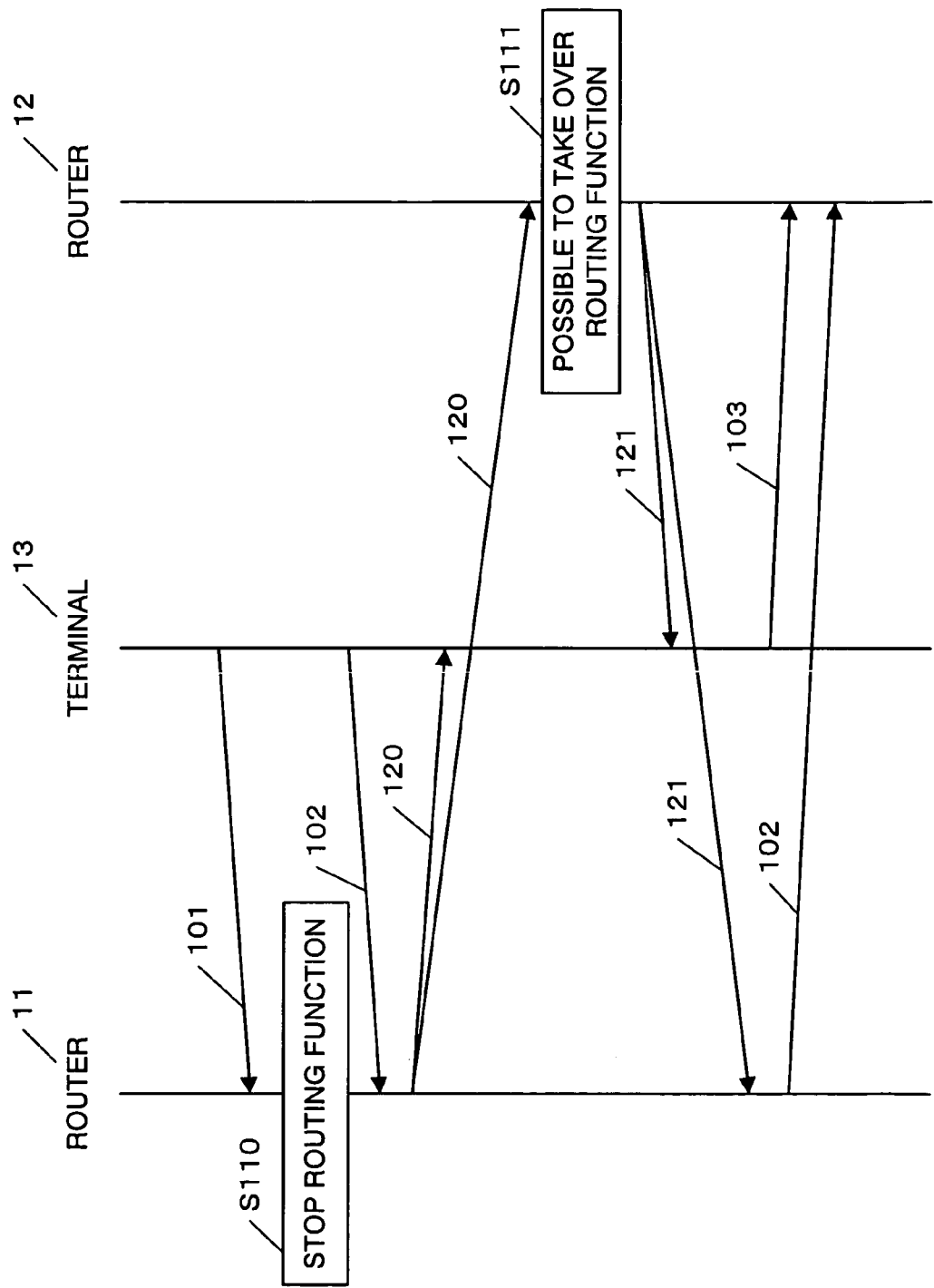

ROUTING CONTROL METHOD, ROUTER, AND TERMINAL

This Application is a U.S. National Phase Application of PCT International Application PCT/JP2004/005292.

TECHNICAL FIELD

The present invention relates to routers, and more particularly to a routing control method, router and terminal for controlling to switch the default router at a terminal on a LAN where there are two or more routers with connecting functions to an external network.

BACKGROUND ART

Conventionally, a mobile-communication terminal has been realized by adding a wireless access interface to a portable terminal.

However, the wireless access networks accessed through such wireless access interfaces are different in coverage, bandwidth, communication fees, etc. depending upon the kind of interface. For this reason, in order to continue communication regardless of where the terminal is moved, there is a necessity to add the interfaces corresponding to a plurality of wireless access networks different in coverage or to exchange the interfaces from place to place.

Moreover, where there is a plurality of terminals, wireless access interfaces must be provided on each of the terminals. This however is problematic in respect of cost and size of the device.

To deal with this problem, there is disclosed in the document "Study on Seamless Handover on Mobile Network" (Y. Matsumoto et al., Shingakugiho, NS2002-323, March 2003) the following art. A group of mobile terminals are connected by means of short-distance wireless interfaces lower in cost and smaller in device size than the wireless access interface, one of the mobile terminals contains a wireless access interface and functions as a router, and the mobile terminals other than the router access an external network via the router. This art eliminates the necessity to mount the wireless access interfaces on all the mobile terminals.

Furthermore, for mobile communication, there is a need to switch between routers mounted with wireless access interfaces (e.g. cellular and wireless LAN) which are respectively different in coverage. The document "Study on Seamless Handover between Mobile Networks" discloses an art allowing continuation of communications regardless of place.

In this manner, in the IP (Internet Protocol), in order to allow communication between a terminal within a local area network (LAN) and a terminal outside the LAN, there is a need to set up a so-called default router in the apparatus of one terminal. The document "Neighbor Discovery for IP Version 6 (IPv6)" (T. Narten, et al., RFC2461, IETF, December 1998) discloses a neighbor discovery protocol (Neighbor Discovery for IP version 6, hereinafter referred to as ND) as a method to automatically set onto a terminal a default router chosen from the router apparatus.

In ND, the router transmits, at regular intervals, router advertisement messages (hereinafter, referred to as RA messages) containing the following pieces of information in response to a solicitation (router solicitation message, hereinafter referred to as RS messages) from the terminal:

(1) router IP address, (2) valid term of the information contained in the message (router lifetime, hereinafter referred to as RL), and (3) reachable time, the time when communication can be made (hereinafter referred to as RT).

The terminal, having received this information, adds the above pieces of information to its own default router list and neighbor cache.

The router selects a default router from among the entries in the list of default routers, and thus has communication with an external network.

Meanwhile, the router, when shutting itself down, transmits an RA with RL=0. When the terminal receives the RA message of RL=0 and if there is a corresponding entry in the default router list, the terminal deletes that entry.

Meanwhile, there is disclosed a method where in a double router apparatus, one of routers is made the master router and the other is made the backup router. A health check request from the backup router to the master router is made, and unless a health check response is received from the master router, the backup router is automatically switched to become the master router (see JP-A-11-261561, for example).

However, where using the method disclosed in the document "Neighbor Discovery for IP Version 6 (IPv6)", an RA message with RL=0 is sent only upon shutting down of the default router by itself. As a result, the usual RA messages continue to be transmitted even when it is difficult or impossible to make connection to an external network due to an overload in the connection of the router to an external network or weakened electric-field strength. For this reason, in order to switch away from a default router that cannot make communication, the terminal is required to recognize that communication with the external terminal is impossible. However, this requires a great deal of time, leaving a problem of long interruptions in communication.

Also, in the method disclosed in JP-A-11-261561, the same MAC address must be shared among a plurality of routers, involving the problem that in some cases it cannot be used on a wireless network where authentication is made at the MAC layer.

DISCLOSURE OF THE INVENTION

It is an object of the present invention to provide a routing control method, router and terminal in which even if failure occurs in a router apparatus used as a master router, lengthy interruption of communication and packet loss are eliminated by switching in predetermined timing from the master router into a backup router, and hence the network resource is managed with efficiency.

In the invention, a routing stop message is multicast by a router to all the nodes (other routers and terminals) within the LAN when it is predicted that the routing function of the router may become impossible to execute due to connection overload to an external network or lessened electric-field strength in the connection to an external network through a wireless interface. Then, when the nodes receive this routing stop message, if the routing function of a router other than the one which may become disabled is enabled or will become enabled after a predetermined time, a routing capability message is multicast to all the nodes (other routers and terminals) within the LAN, thereby realizing quick router switchover.

Furthermore, in the case the router which has already stopped its routing function receives a packet from the LAN to be sent to an external network, it is stored in the buffer of that router until a routing capability message from another router is received. Thereafter, routing function is switched over to that capable router, and by transferring the packet to that capable router, the packet is kept from being lost.

A routing control method in a first embodiment of the invention is a routing control method for a local area network (LAN) comprising one or more terminals having at least one LAN interface, one or more routers having a routing function to perform a relay of data between the LAN and an external network, and a LAN medium connecting the terminals and routers, the routing control method characterized in that: the router, during execution of the routing function, multicasts a routing stop message notifying stop of its routing function if its routing function is disabled or predicted to become disabled, and another of the routers which receives this routing stop message multicasts a routing capability message if its routing function is enabled, so that the routing function is switched.

Due to this, the interruption of routing function is prevented.

Meanwhile, a routing control method in a second form of the invention is a routing control method comprising: a step that a first router monitors its connection status with an external network and when it decided to cancel the connection, it sends a message notifying the routing stop time, the time remaining until stop of routing function, to the nodes of the local area network to which the first router is connected; a step that a second router which receives the routing stop message transmits a routing capability message if it can execute the routing function, the message giving a transition time, the time required to enable the routing function, to the nodes in the local area network to which the second router is to be connected; and a step that the nodes receiving the routing stop message and the routing capability message switch the destination of their transmissions from the first router over to the second router.

Due to this, the routing switchover time for the terminals and the other router capable of executing the routing function can be predicted. Because routing switchover time can be predicted, interruption of routing of data from a terminal can be prevented.

Meanwhile, a routing control method in a third form of the invention includes a step if the first router receives a message directed toward an external network after a stop of router function, in which the first router stores the message; and a step that the first router, after receiving the routing capability message from the second router, transfers the stored message to the second router.

This can prevent the message from being lost during a switchover of routing function.

Meanwhile, a routing control method according to a fourth form of the invention is configured so that in the third form, the first router, after received the routing capability message, transfers the stored message to the second router after the lapse of the routing capability of the first router.

Due to this, because the message entrusted to the first router is transferred to the second router, the message to be sent to an external network can be prevented from being lost.

Meanwhile, a routing control method according to a fifth form of the invention is configured so that in the second form the second router recognizes that the first router stops the routing function if the routing stop time contained in the message received from the first router is equal to or smaller than a predetermined time.

With this operation, notification of routing stop can be made without a separate message.

A router according to a sixth form of the invention comprises: a stop message receiving section for receiving a routing stop message notifying a routing stop time, the time remaining before stop of routing function, from another router executing the router function; a master transition deciding section of another router acting when the message receiving section receives the routing stop message to decide whether or not that router can execute the routing function when the message receiving section receives the routing stop message; a transition time calculating section for calculating the time required for starting routing function when the master transition deciding section decides that the routing function can be executed; a routing capability message generating section for generating a routing capability message giving the time required to enable routing; and a capability message transmitting section for transmitting the routing capability message to nodes on a local area network to which the router is connected.

Due to this, communication interruption can be prevented by having one router take over the routing function from another router incapable of continuing the routing function.

Meanwhile, a router according to a seventh form of the invention is configured so that the sixth form further includes a status monitoring section for monitoring the status of connection with an external network and deciding whether or not to cancel a connection; a routing stop time calculating section for calculating the time remaining until the routing stop when the status monitor section decides to cancel connection with the router while the router is still executing routing function; a routing stop message generating section for generating a routing stop message describing the time calculated by the routing stop time calculating section; and a stop message transmitting section for transmitting the routing stop message to nodes in the local area network to which the router is connected.

Due to this, notification can be made to such nodes as other routers and terminals before stopping the router function.

Further, a router according to an eighth form of the invention is configured so that the seventh form further includes a buffer for storing a message received from the local area network to be sent to an external network after stop of the routing function, and a capability message receiving section for receiving a routing capability message from another router, whereby, when the routing capability message is received, the message stored in the buffer is transmitted to the router which is the source of the routing capability message.

This can prevent a message from being lost during a switchover of routing function.

Meanwhile, a router according to a ninth form of the invention is configured so that in the seventh form, the routing stop message is a router advertisement message in ICMPv6, and the routing stop time is set in the lifetime field thereof and thus is sent together with the routing stop message.

This can realize a routing stop message without making a change or addition to the existing ICMPv6 field.

Meanwhile, a router according to a tenth form of the invention is configured so that in the seventh form, if the routing stop time in the routing stop message received is equal to or smaller than a predetermined time, it is decided that the router which is the source of the routing stop message is now stopping routing function.

This enables a notification of a stop of routing without a separate message.

Meanwhile, a router according to an eleventh form of the invention is configured so that in the seventh form, the routing capability message is a router advertisement message in ICMPv6, and the time required to enable the routing function is set in the reachable time field thereof, so as to be sent together with the routing capability message.

This can realize a routing capability message without modifying the existing field of or adding extra field to ICMPv6.

A terminal according to a twelfth form of the invention comprises: a terminal receiving section for receiving a routing stop message giving the routing stop time, the time remaining until stop of routing function of a first router now executing the routing function, and a routing capability message notifying the routing capability time, the time required to enable routing function by a second router; and a router switch section for switching the first destination of a communication to be sent to an external network from the first router over to the second router when the terminal receiving section receives a routing stop message and a routing capability message.

Due to this, even in case the routing function of the router in use stops, communication can be continued by use of the routing function of another router.

Meanwhile, a terminal according to a thirteenth form of the invention is configured so that in the twelfth form, the switching by the router switch section is done after the lapse of the routing operation of the first router and during the routing capability time.

This allows for router switchover with further smoothness.

As described above, according to the invention, when a failure occurs in the master router, switchover is made from the master router into a backup router without delay. The default router of the terminal is also switched without delay. This makes it possible to manage the network resources with efficiency because packet loss can be kept low.

BRIEF DESCRIPTION OF THE DRAWINGS

FIG. 11 is a figure showing a third structure of a default router management table according to embodiment 1 of the invention.

FIG. 12 is a figure showing a fourth structure of a default router management table according to embodiment 1 of the invention.

FIG. 13 is a figure showing a structure of a neighbor cache table according to embodiment 1 of the invention.

FIG. 14 is a figure showing a default router switchover sequence according to embodiment 1 of the invention.

BEST MODE FOR CARRYING OUT THE INVENTION

Embodiments of the present invention will be explained by use of the drawings.

Embodiment 1

Figure 1:
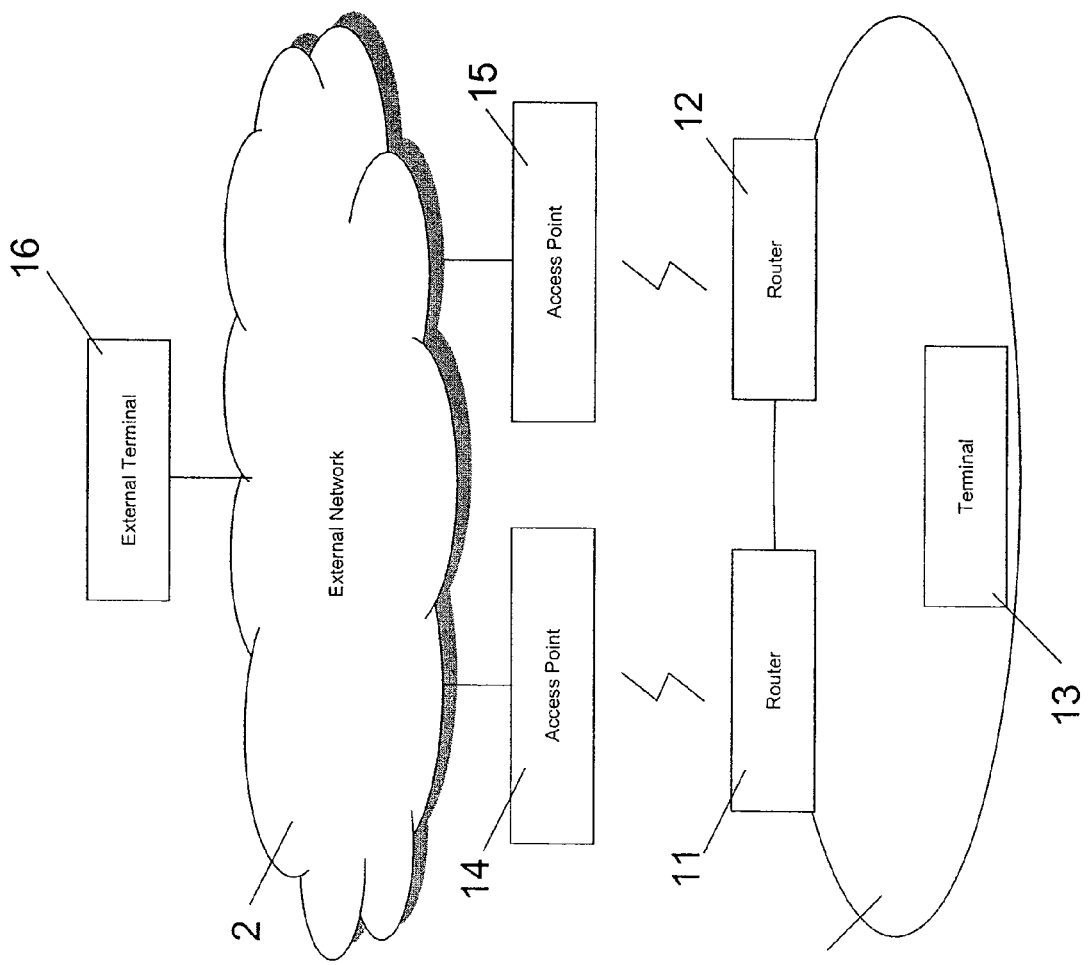
FIG. 1 is a diagram showing a network arrangement according to embodiment 1 of the present invention.

FIG. 1 is a diagram showing a network arrangement according to embodiment 1 of the invention.

In FIG. 1, routers 11 and 12 are to provide a so-called routing function for relaying the communication between LAN 1 and external network (Internet) 2. Terminal 13 belongs to LAN 1 while external terminal 16 exists on external network 2. Access point devices 14, 15 operate respectively as points to be connected to the Internet for routers 11, 12. Although the connections between access point device 14 and router 11 and between access point device 15 and router 12, are by wireless communication in the figure, wired communication may be applied, i.e. the invention does not limit the type of connection. Meanwhile, either wireless communication or wired communication may be used between terminal 13 and router 11 or 12.

Explanation of the configuration and operation of the routers and terminals according to the invention will now be made. This embodiment is premised on communication using IPv6 within LAN1, but IPv4 or other protocols also are usable.

Figure 3:
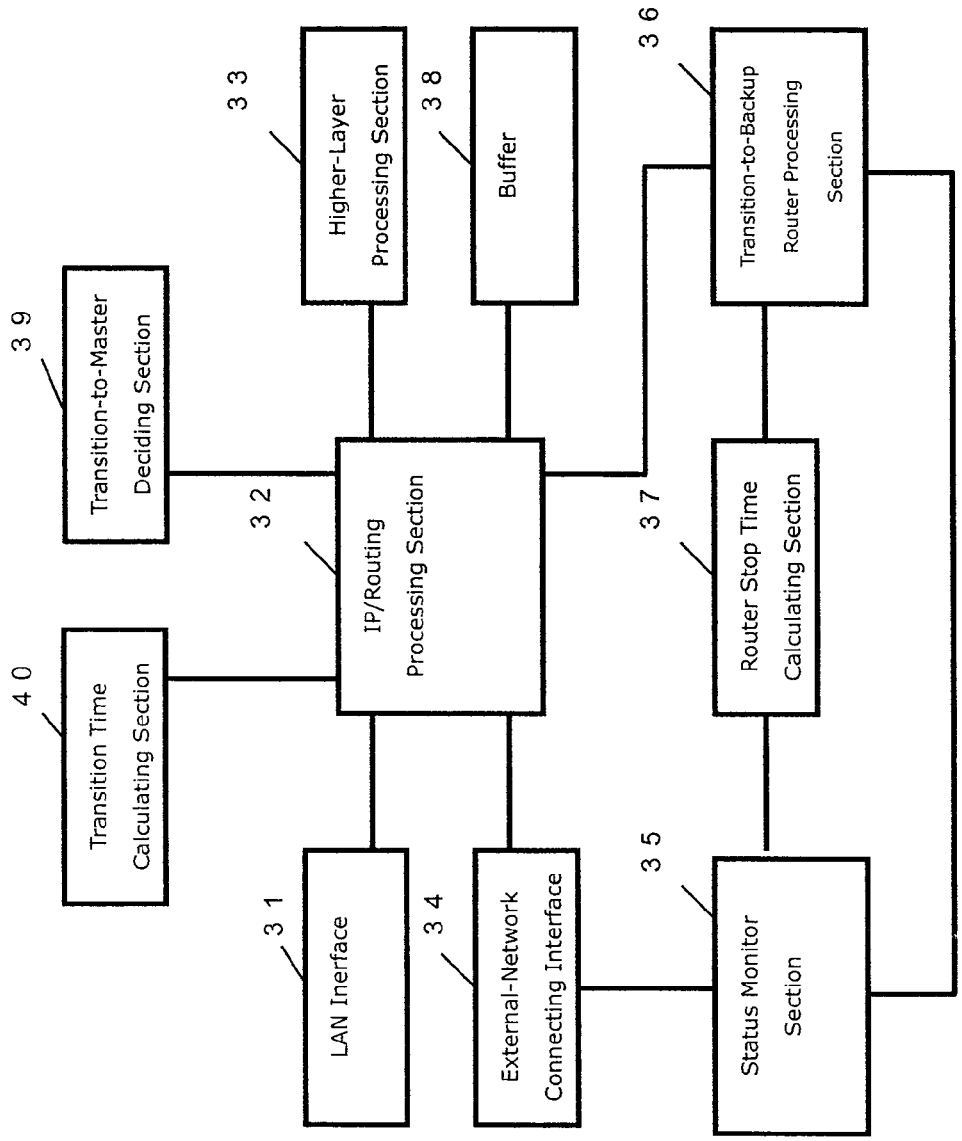
FIG. 3 is a diagram showing a configuration of a router according to embodiment 1 of the invention.

FIG. 3 is a diagram showing a configuration of router 11 or 12.

In FIG. 3, LAN interface 31 executes a physical-layer processing and data-link-layer processing in the communication with terminal 13 and other routers within LAN 1. External-network connecting interface 34 connects with an external network 2 through access point 14, 15. IP/routing processing section 32 executes an IP processing and routing processing. Higher-layer processing section 33 performs TCP, UDP or ICMP protocol processing which is higher in level than IP processing, as well as processing of applications and so on.

Meanwhile, status monitor section 35 detects a deterioration in communication condition due to a disconnection between external-network connecting interface 34 and access point device 14, 15, an increased bit error rate in code division multiple access (CDMA) or a lowered strength of electric field in radio communication.

Meanwhile, transition-to-backup-router processing section 36 decides whether to stop a router during its operation as a master router depending upon the communication condition notice sent from the status monitor section 35, thereby controlling the process up to a router shutdown.

Meanwhile, the router-shutdown-time calculating section 37 measures the increase of bit error rate or the decrease in electric-field intensity as notified from the status monitor section 35 with time, thereby calculating the time until a preset allowable value limit is reached, or if in the process of shutdown, the time until shutdown is completed. Also, buffer 38, explained next, adds time for buffering, and then final setting of lifetime 87 is made.

Meanwhile, when a router changes from the state from the master router into a backup router by stopping its router function, buffer 38 stores temporarily a packet headed for an external network received through LAN interface 31 after stop of the router function. Alternately, upon a shift from the backup router into a master router, a packet headed for external network received through LAN interface 31 is temporarily stored before starting a router function.

Meanwhile, when the transition-to-master deciding section 39, is a backup router, it predicts whether or not the routing processing can be performed by confirming whether one of the following is true.

(1) Connection between access points 14, 15 and external-network connection interface 34 can be set up after a predetermined time.

(2) Router 12 is in a sleep status and setup for a routing process can be completed after a predetermined time.

Here, transition-time calculating section 40 calculates the predetermined time given in the above (1) and (2).

Explanation of the operation of the router 11 and 12 configured as above will now be made.

Figure 6:
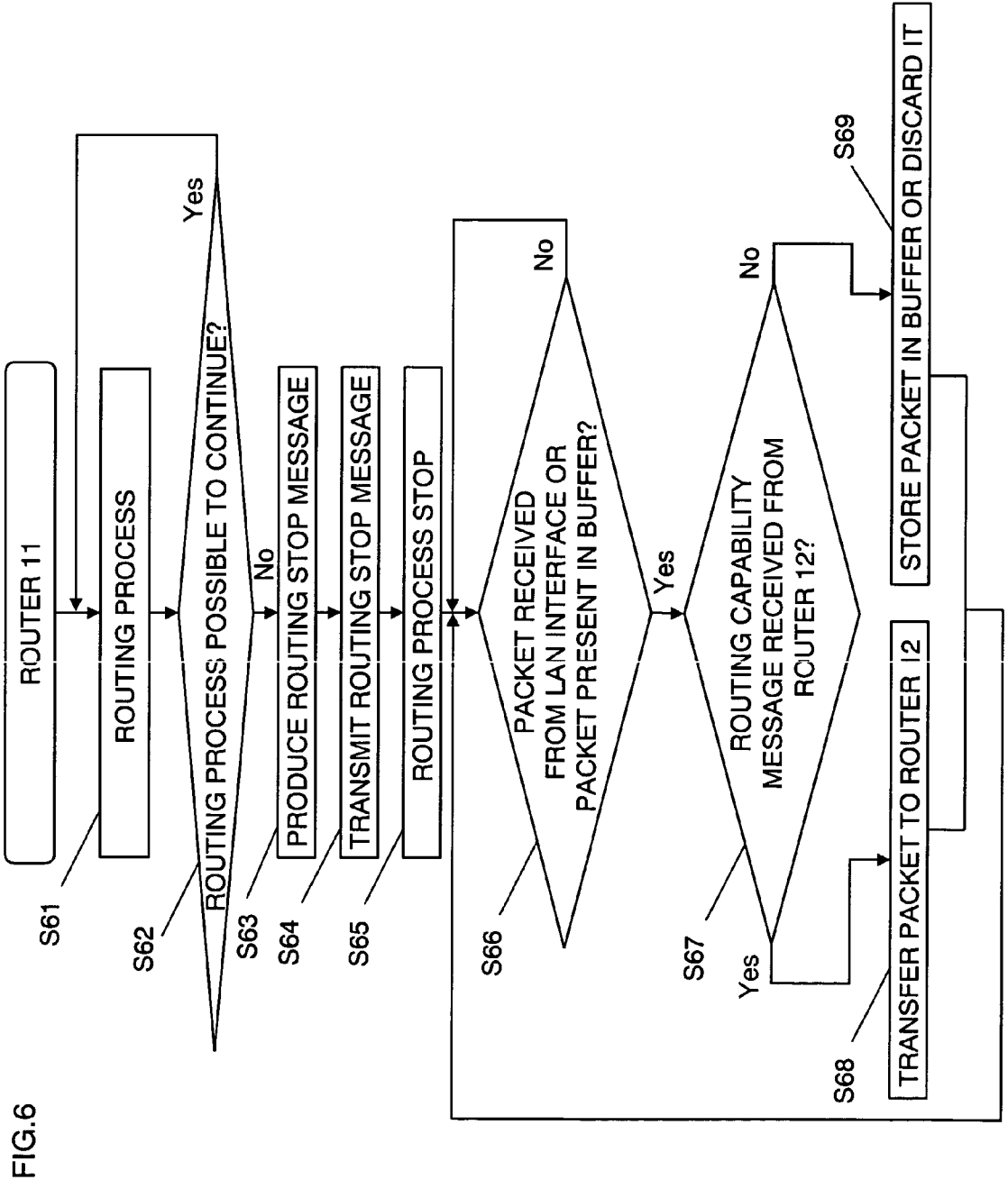
FIG. 6 is a flowchart showing a first operation of the router according to embodiment 1 of the invention.

FIG. 6 is a flowchart showing the procedure for processing the router 11 which had been executing the routing function, at the time the routing function becomes disabled.

At first during executing the usual routing process by the IP/routing processing section 32 (step S61), if the routing operation becomes impossible or is predicted to become impossible as determined by the communication state detected by the status monitor section 35 (step S62), the fact of communication impossibility is notified to transition-to-backup-router processing section 36.

Then, after receiving the notification, the transition-to-backup-router processing section 36 produces a routing stop message (step S63) and sends it by multicast to terminal 13 and router 12 existing on LAN 1 (step S64).

Figure 8:
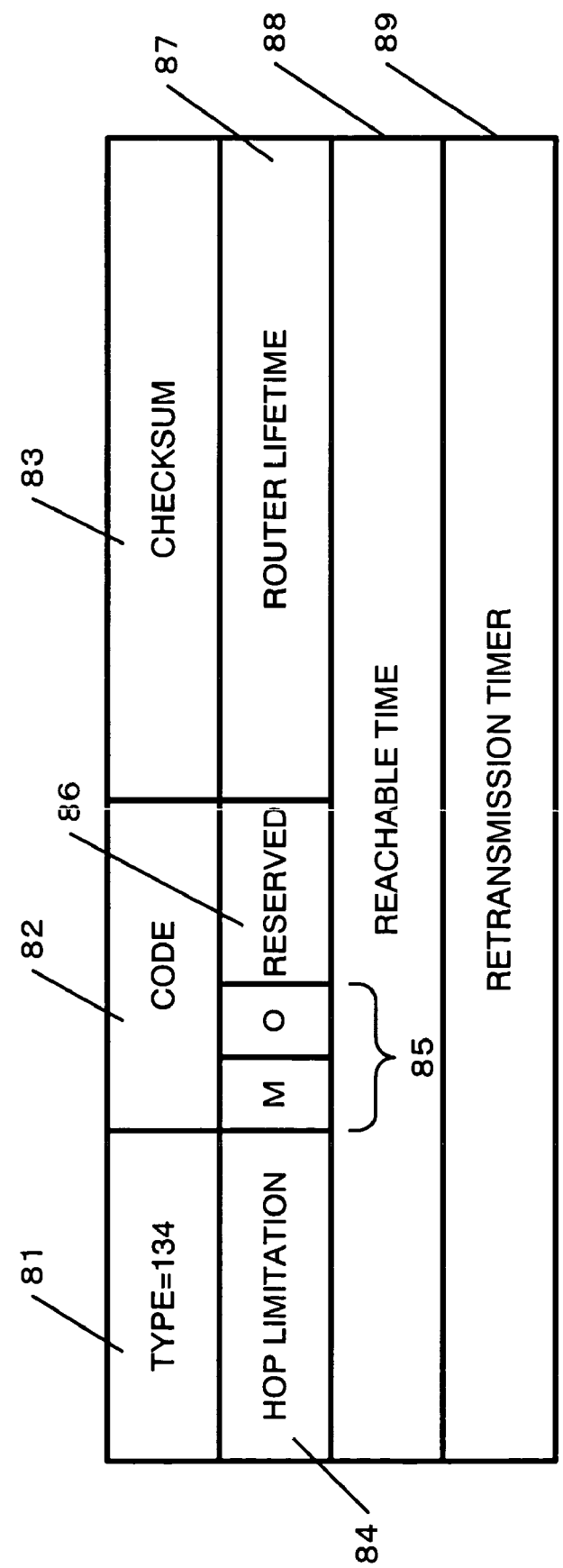
FIG. 8 is a figure showing a structure of a router advertisement message according to embodiment 1 of the invention.

The routing stop message can be prepared by using a format of RA message 80 shown in FIG. 8. RA message 80 comprises the fields of type 81, code 82, checksum 83, hop limit 84, reserve 86, router lifetime 87, reachable time 88 and retransmission timer 89. Incidentally, it is possible to use a format different from RA message 80.

In RA message 80, router lifetime 87 particularly decides the content of the routing stop message. Router lifetime 87 indicates the period of validity of the information communicated.

The transition-to-backup-router processing section 36 sets the router lifetime 87 at 0 when routing is already impossible to perform. When routing is predicted to become impossible due to detection of deteriorated communication conditions, it sets router lifetime 87 to be the predicted time of router stop, as calculated by the calculating section 37.

Then, the transition-to-backup-router processing section 36 measures the time remaining until the routing-stop prediction time which has been given. When this time has elapsed, notification is made to the IP/routing processing section 32. Receiving it, the IP/routing processing section 32 stops the routing process (step S65).

Thereafter, IP/routing processing section 32 checks whether or not a packet destined for external terminal 16 (step S66) has been received from LAN interface 31. If it has been received, check is made as to whether or not a routing capability message from another router (here, router 12) has been received (step S67). If received, the packet is transferred to router 12 (step S68) and the process returns to the step S66. The routing capability message gives a MAC address of the router which is the source of the message and the time required for enabling router function.

Meanwhile, when a routing capability message has not been received, packets are stored in the buffer until a predetermined amount has been stored (step S69), and then the process returns to step S66.

Meanwhile, when a routing capability message from another router is received while a packet is in the buffer, the packet in the buffer 38 is transferred to the other router newly turned into a master router (step S66, S67, S68).

Figure 7:
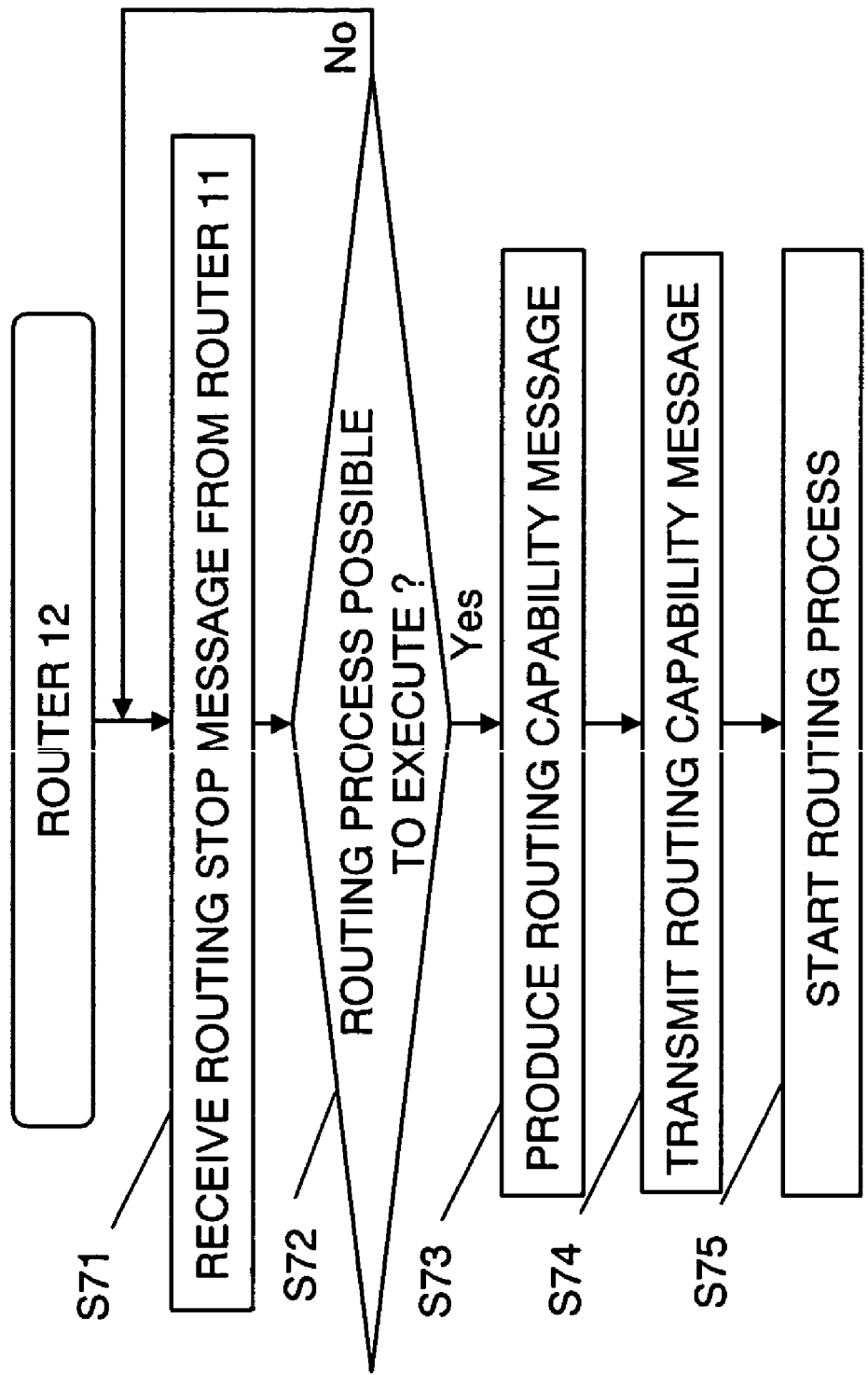
FIG. 7 is a flowchart showing a second operation of the router according to embodiment 1 of the invention.

FIG. 7 is a flowchart showing a process procedure to be executed when backup router 12 receives a routing stop message from master router 11.

If IP/routing processing section 32 receives a routing stop message from router 11 (step S71), it gives the message to the transition-to-master deciding section 39. The transition-to-master deciding section 39 decides whether routing process is already enabled or is predicted to be enabled within a predetermined time (step S72). In the case of a decision that a router is capable of becoming a master router, a routing capability message is produced (step S73) and multicast by multicast to all of terminals 13 and other routers of within LAN 1 (step S74).

Thereafter, IP/routing processing section 32 starts execution of routing function (step S75).

Here, the routing capability message uses the format of an RA message 80 shown in FIG. 8, similarly to the routing stop message. The types of routing capability messages are set in the type 81 field, the lifetime of the information in the message is indicated in the router lifetime 87 field, and the time required to enable routing function is set in the reachable time 88 field.

For IPv4, setting of predicted time until routing-start is not made, because of absence of a reachable time RT field 88 in RA message 80. In this case, RA message 80 is transmitted as soon as a routing process is started. Alternatively, in the case a buffer is provided which can store packets in router 12, RA message 80 is transmitted in advance of start of the routing process so that a packet received can be stored before start of the execution of a routing process.

Incidentally, at step 71, where the routing stop message received uses an RA message 80 format of IPv6, RA message 80 is determined to be a routing stop message when the router lifetime field 87 is equal to or smaller than a certain threshold. Although this is a case where RA messages 80 of IPv6 or IPv4 are used, the invention is not limited to the RA message 80 format but may be in any form provided that the message indicates routing stop.

As described above, in the router of this embodiment, a routing stop message is transmitted from the master router when the routing function becomes inoperative. Accordingly, another router serving as a backup router which receives this message can immediately start preparing for operating the routing if it decides that it can take over this function. Therefore, this makes it possible to suppress the switchover delay between master and backup routers to the greatest extent possible.

Explanation is now made of the configuration and operation of terminal 13 according to this embodiment.

Figure 2:
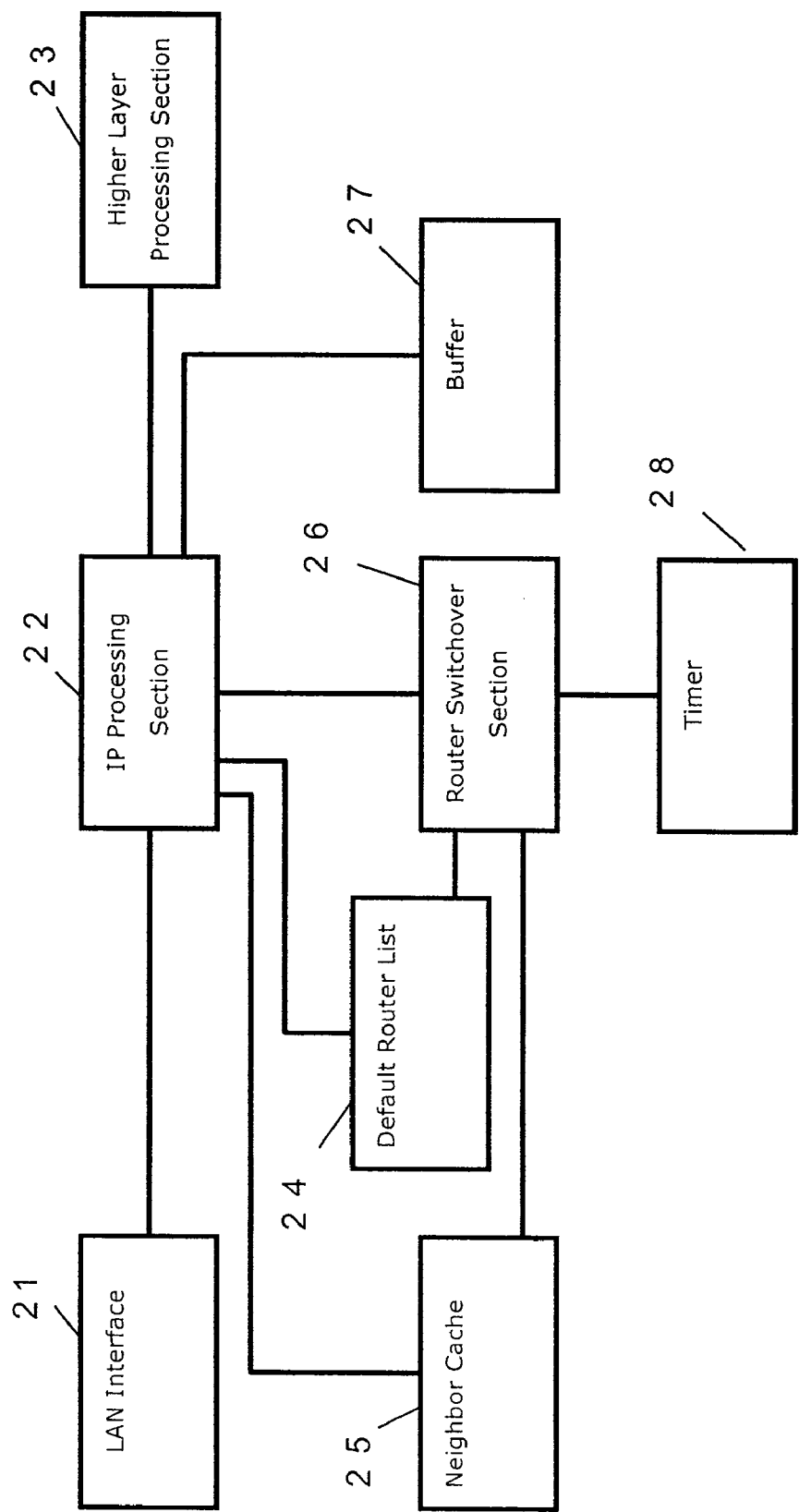
FIG. 2 is a diagram showing a configuration of a terminal according to embodiment 1 of the invention.

FIG. 2 is a diagram showing a configuration of terminal 13.

In FIG. 2, LAN interface 21 executes physical-layer and data-link-layer processing for the communication with the other terminals and routers in the LAN 1, and corresponds to a terminal receiver section. IP processing section 22 executes IP processing, processing in the network layer. Higher-layer processing section 23 executes protocol processing of TCP, UDP or ICMP, higher in level than the network layer, and an application processing and so on.

Meanwhile, default router list 24 is a table listing routers usable as a default router. Neighbor cache 25 is a table for determining a link-layer address, where IP addresses of the terminals and routers existing on LAN 1 are used as key information.

Meanwhile, router switchover section 26 counts the transition time for the backup router existing in neighbor cache 25 to change into the master router, switching the default router with the same timing as this switchover. Incidentally, router switchover section 26 refers to the default router list 24 and neighbor cache 25 at the time of the packet transmission, thus deciding on a router for transmitting a packet to an external terminal.

Meanwhile, buffer 27 is a storage device for temporarily storing a transmission packet while timer 28 is to notify a lapse of unit time.

Here, FIGS. 9 to 12 show a structural example of default router list 24 while FIG. 13 shows a structural example of neighbor cache 25.

Figure 9:
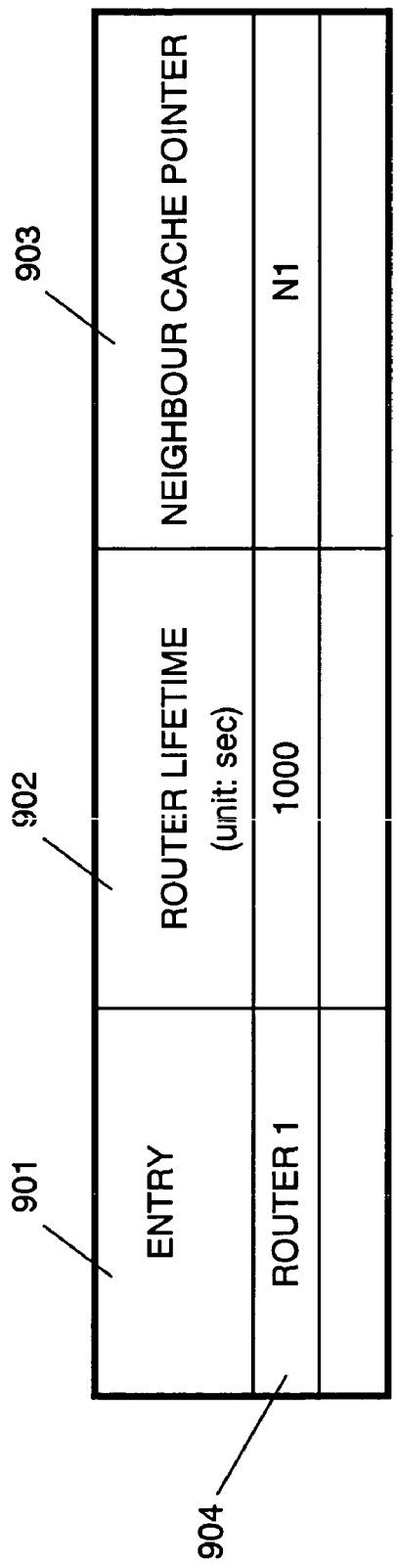
FIG. 9 is a figure showing a first structure of a default router management table according to embodiment 1 of the invention.

The default router list 24 shown in FIG. 9 is a table showing a listing of routers usable as a default router at terminal 13. This has the entries 901 of registered routers, router lifetime RL 902 indicative of the remaining lifetime of entry information, and pointer 903 pointing to the corresponding neighbor cache entry.

The neighbor cache 25 shown in FIG. 13 is a table for determining a link-layer address using the IP addresses of the terminal 13 and routers 11, 12 in LAN 1 as key information. Each entry 1301 includes IP address 1302, transition time 1303 indicating remaining time until the router function becomes operative, and link-layer address 1304. Note that the default router list 24 and neighbor cache 25 are configured to include only the minimum degree of information required for explanation and may include other pieces of information. Incidentally, it is assumed that the neighbor cache 25 uses IPv6. For IPv4, an ARP table corresponds to neighbor cache 25. The ARP table is different from neighbor cache 25 in respect of the following points:

(1) The IP address 1302 value is an IPv4-based address.

(2) There is no reachable time RT 1303 field 1303.

Accordingly, similar processing can be realized by adding a reachable time 1303 field or assuming all the values of reachable time 1303 to be zero.

Figure 4:
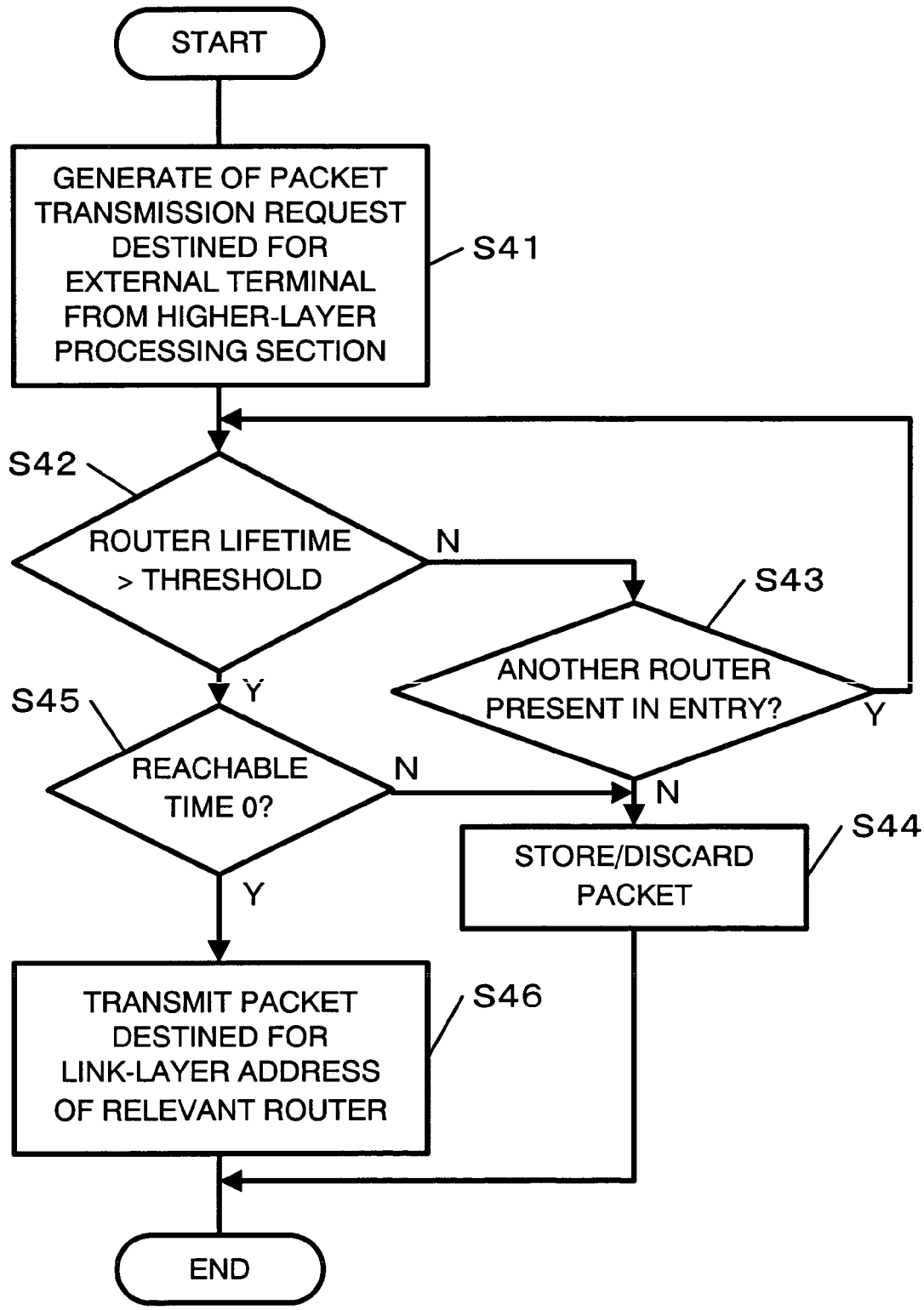
FIG. 4 is a flowchart showing a first operation of the terminal according to embodiment 1 of the invention.

Using FIG. 4, the operation of terminal 13 structured as above will now be explained.

At first, IP processing section 22, after receiving a request from the higher-layer processing section 23 to transmit a packet to an external terminal 16 (step S41), asks router switchover section 26 for a router to transmit the packet. Router switchover section 26 checks the entries 901 in the default router list 24 as to whether or not the router lifetime is greater than a threshold TH (step S42).

When the router lifetime is equal to or smaller than the threshold, router switchover section 26 checks whether or not there is another entry in entry 901 (step S403). In there is, the process returns to the step S42. Meanwhile, in the case there is no other entry, the determination is made that every router registered has a lifetime equal to or smaller than the threshold, and this determination is sent to IP processing section 22. Receiving it, the IP processing section 22 stores the packet in buffer 27 or discards it (step S44). In the case of storage in the buffer, packet transmission is again attempted when there is update, etc. of default router list 24. Meanwhile, under IPv4 or IPv6, the routers of within LAN 1 can be searched for by use of an RS message. When search yields a suitable router, the packets stored are transmitted to that router.

At step S42, when the router lifetime is greater than the threshold, the router switchover section checks neighbor cache 25 and confirms, from neighbor cache pointer 903 of the entry, whether or not transition 1303 of the entry has finished (becoming 0). When it is not completed, router switchover section 26 responds router to the inquiry of the IP processing section 22 that the there is no router to which the packet can be sent, and the process moves to step S44.

Meanwhile, when transition has been completed, router switchover section 26 responds to the inquiry of the IP processing section 22 with a link-layer address 1304 of a router in the entry in question. Receiving this address, IP processing section 22 transmits a packet from LAN interface 21 of terminal 13 to the link-layer address received, and the process is ended (step S46).

Here, the threshold TH is set at as small as possible, and may be "0". However, when propagation delay is great at between the terminal and the router, a value equal to or greater than TH=1 may be set.

Figure 5:
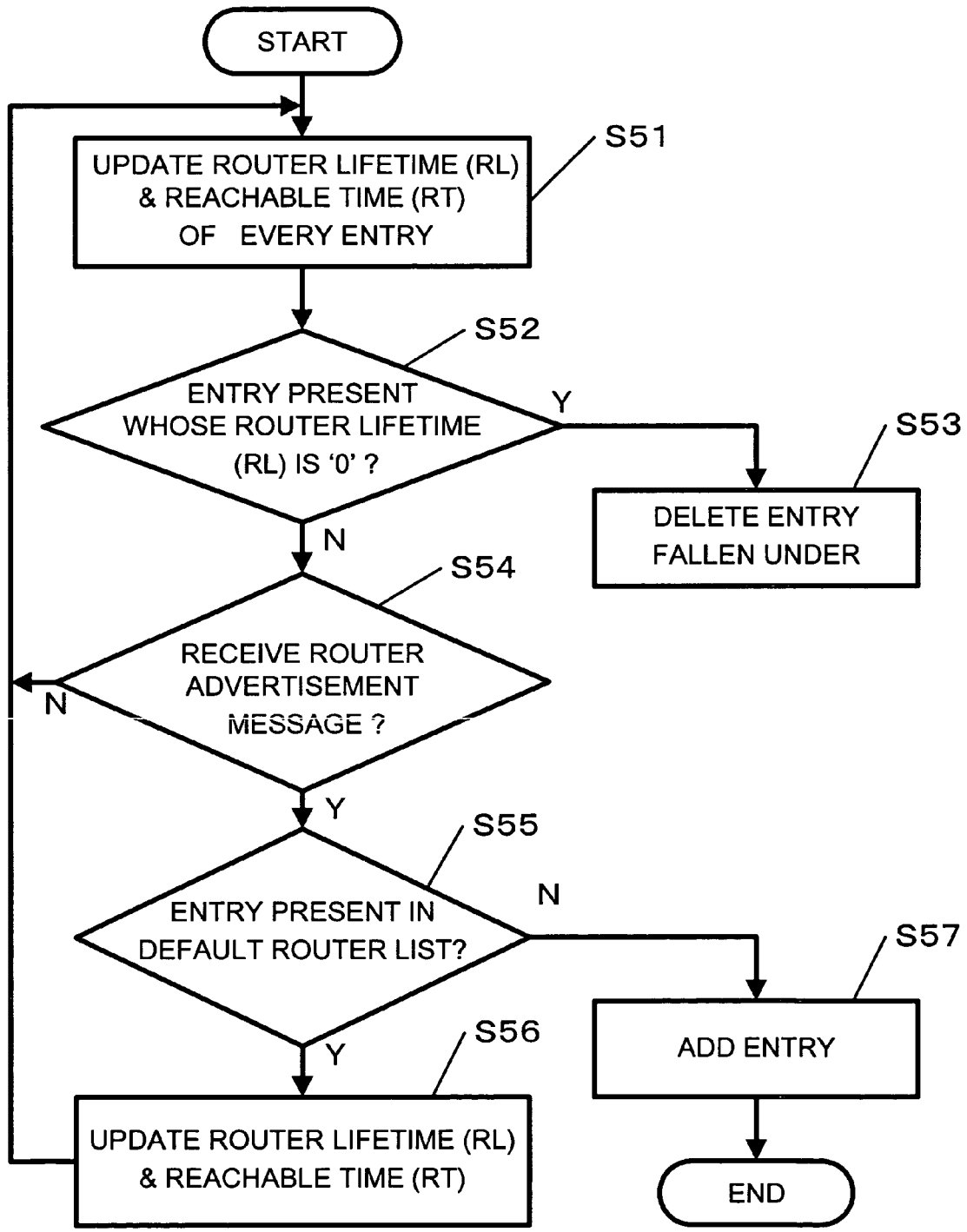
FIG. 5 is a flowchart showing a second operation of the terminal according to embodiment 1 of the invention.

Using FIG. 5, explanation is now made on the procedure of default router list maintaining process at the terminal 13.

At first, router switchover section 26 updates the router lifetime and transition time for all the entries in default router list 24, each time a set time interval has passed as notified by timer 28 (step S51).

Then, router switchover section 26 checks whether or not there is an entry whose router lifetime has become 0 (step S52) and deletes such entries (step S53).

In the invention, the update process of default router list 24 is not limited in timing to the present embodiment, i.e. update may be made only upon transmitting a packet. However, in order that correct values of router lifetime and transition time are used at time of packet transmission, update can be made when there is a need to look up the default router list during packet transmission.

Then, if router switchover section 26 receives an RA message 80 of FIG. 8, referred later, from the router (step S54), it checks whether or not there is already an entry of a router in the default router list (step S55). If there is (S56), entry content is updated in terms of router lifetime and transition time according to the content of RA message 80 received (step S56), and the process returns to step S51. Meanwhile, if there is no entry of a router, a router is added to the default router list, and then the process is ended (step S57).

Due to this, even in case the routing function is stopped of the router in use, the terminal can swiftly switch another router to be the default router and continue communication by use of the routing function of the new router.

Incidentally, in the case of the routing stop message and routing capability message using an RA message of IPv6, the operation according to the format of IPv6 can be realized even on a terminal not having the function of this embodiment, by setting transition time in the reachable time field and routing stop time in the router lifetime field. A similar effect can be obtained because a function similar to the terminal of this embodiment can be realized.

Using FIG. 14, the operation where the default router in this embodiment is switched from router 11 over to router 12 will next be explained.

FIG. 14 is a sequence chart explaining a switchover of default router according to the invention.

At first, terminal 13 uses router 11 as a default router in order for communication with external terminal 16, thereby sending communication data 101 to router 11.

The terminal 13, at this time, has a default router list 24 given in FIG. 9.

Then, router 11 determines that communication condition between external-network connecting interface 34 and access point 14 is worsened so that routing function will become impossible to carry out 1 second later (step S110), and multicasts a routing stop message 120 to router 12 and terminal 13.

Here, prior to a reception of the routing stop message 120 by terminal 13, the communication data 102 transmitted from terminal 13 is stored in router 11.

Figure 10:
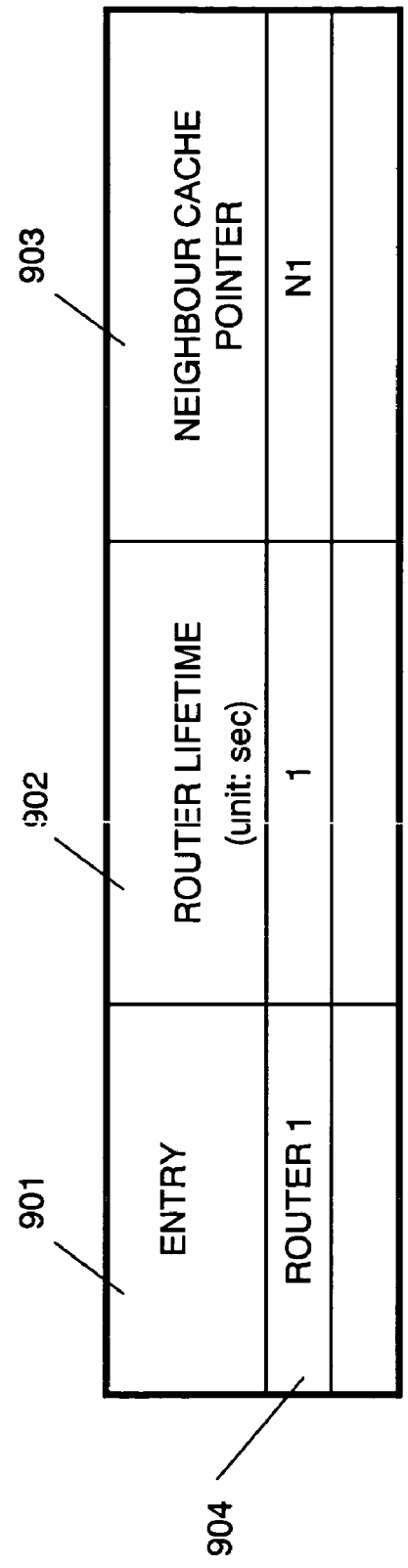
FIG. 10 is a figure showing a second structure of a default router management table according to embodiment 1 of the invention.

Terminal 13 which received the routing stop message 120 has a default router list 1000 given in FIG. 10. This list states that router 1 has a router lifetime 902 of 1 second.

When router 12 receives the routing stop message 120, it starts to set up connection between its external-network connecting interface 34 and access points 15, anticipating that the setting up will be completed 300 msec later, for example (step S111). Then, router 12 sends a routing capability message 121 to router 11 and terminal 13.

After receiving the routing stop message 120, terminal 13 holds the data 103 to be sent to external terminal 16. Terminal 13 switches its default router according to timing determined by the routing stop time contained in the routing stop message 120 and the routing start time contained in the routing capability message 121. After that, terminal 13 transmits communication data 103 to router 12.

Also, when terminal 13 receives the routing capability message 121 from router 12, it updates default router list 1100 as shown in FIG. 11.

Thereafter, terminal 13 uses router 11 as a default router for 1 second and then updates default router list 1200 as shown in FIG. 12. Then, terminal 13, after the default router list is changed as shown in FIG. 12, uses router 12 as a default router and continues communication with external terminal 16.

Meanwhile, when router 11 receives the routing capability message 121 and decides that router 12 is to take over the routing function, router 11 transmits stored communication data 102 to router 12.

As explained above, in the invention, in the case terminal 13 is in communication with external terminal 16 through router 11 as a relay point to an external network 2, i.e. the so-called default router, when it is predicted that the routing function by router 11 will become disabled, router 11 multicasts a routing stop message stating that its provision of a routing function to all the other nodes (here, terminal 13 and router 12) existing in LAN 1 will become impossible. Router 12 receives the routing stop message, and if router 12 is capable of executing the routing function, it multicasts a routing capability message to all the nodes (here, terminal 13 and router 11) existing in LAN 1. This allows router 13 to switch its default router from router 11 over to router 12 based on the routing stop message and routing capability message. This can greatly suppress the delay time in default router switching.

Furthermore, even if the default router switching by terminal 13 is late in time and router 11 receives a packet from terminal 13, router 11 stores it. Then, when router 11 receives a routing capability message, the packet is transferred to the router becoming the new master router 12. Therefore, it is possible to greatly suppress packet loss and hence manage the network resource with efficiency.

Meanwhile, the invention can be used on a wireless network which makes authentications in the MAC layer because of its capability of using different MAC addresses for the respective routers.

INDUSTRIAL APPLICABILITY

As described above, the invention is a useful routing control method, router and terminal on a LAN where there are two or more routers having a connecting function connecting terminals to an external network, suited for switching over between master and backup routers or switching the default router for the terminal.

LIST OF IN-DRAWING REFERENCES

1. Local area network (LAN)
2. External network
11, 12. Router
13. Terminal
14, 15. Access point device
16. External terminal
21. LAN interface
22. IP processing section
23. Higher-layer processing section
24. Default router list
25. Neighbor cache
26. Router switchover section
27. Buffer
28. Timer
31. LAN interface
32. IP/routing processing section
33. Higher-layer processing section
34. External-network connecting interface
35. Status monitor section
36. Transition-to-backup-router processing section
37. Router stop time calculating section
38. Buffer
39. Transition-to-master deciding section
40. Transition time calculating section

The invention claimed is:

1. A routing control method comprising:
   monitoring, by a first router, a status of a connection with an external network and when the connection is to be cancelled, transmitting, by the first router, a routing stop message notifying a routing stop router time, as a time remaining until a stop of a routing function of the first router, to nodes in a local area network to which the first router is connected;
   determining, by a second router, a routing capability time required to enable the routing function when the second router is configured to execute the routing function;
   transmitting, by the second router to the nodes in the local area network to which the second router is connected, a routing capability message that includes the routing capability time; and
   setting a time for switching, by the nodes receiving the routing stop message and the routing capability message, a destination of transmissions from the first router to the second router based on the routing capability time inside the routing capability message, wherein the routing capability time is determined in and transmitted from the second router.

2. The routing control method according to claim 1, including:
   if the first router receives a message directed toward the external network after the stop of the routing function of the first router, storing, by the first router, the message directed toward the external network; and
   after the first router receives the routing capability message from the second router, transferring, by the first router, the stored message to the second router.

3. The routing control method according to claim 2, wherein after the first router receives the routing capability message, transferring, by the first router, the stored message to the second router after the routing capability time has lapsed.

4. The routing control method according to claim 1, further comprising:
   deciding, by the second router, that the routing function of the first router has stopped if the routing stop time in the message received from the first router is equal to or smaller than a predetermined time.

5. The routing control method according to claim 1, wherein the second router calculates the routing capability time based on a time required to set up connection to the external network or a time required to set up for a routing process.

6. A router comprising:
   a stop message receiving section for receiving a routing stop message indicating a routing stop time, as a time remaining until a stop of a routing function, from another router which is executing the routing function;
   a master transition deciding section for deciding whether or not the router is configured to execute the routing function when the message receiving section receives the routing stop message;
   a transition time determining section for determining a routing capability time required to enable the routing function when the master transition deciding section decides that the router is configured to execute the routing function;
   a routing capability message generating section for generating a routing capability message including the routing capability time; and
   a capability message transmitting section for transmitting the routing capability message to nodes in a local area network to which the router is connected such that the nodes receiving the routing stop message and the routing capability message are configured to set a time for switching a destination of transmissions from the another router to the router based on the routing capability time inside the routing capability message, wherein the routing capability time is determined in and transmitted from the router.

7. The router according to claim 6, further including:
   a status monitor section for monitoring a status of a connection with an external network and deciding whether or not to cancel the connection;
   a routing stop time calculating section for calculating the routing stop time remaining until the stop of the routing function of the router when the status monitor section decides to cancel the connection during execution of the routing function;
   a routing stop message generating section for generating the routing stop message indicating the time calculated by the routing stop time calculating section; and
   a stop message transmitting section for transmitting the routing stop message to one of the nodes on the local area network to which the router is connected.

8. The router according to claim 7, further including:
   a buffer for storing a message to be sent to the external network, received from the local area network to which the router is connected after the routing function is stopped, and
   a capability message receiving section for receiving the routing capability message from the another router,
   wherein, when the routing capability message is received, the message stored in the buffer is transmitted to a source router which is a source of the message.

9. The router according to claim 7, wherein the routing stop message is a router advertisement message of ICMPv6 and has the routing stop time set in a lifetime field thereof, and the routing stop message is sent to the nodes in the local area network.

10. The router according to claim 7, wherein, if the routing stop time in the routing stop message received is equal to or smaller than a predetermined time, the router, which is a source of the routing stop message, is under transition to stop the routing function.

11. The router according to claim 7, wherein the routing capability message is a router advertisement message of ICMPv6 and the time until the routing function is enabled is set in a reachable time field thereof, and the routing capability message is sent to the nodes in the local area network.

12. The router according to claim 6, wherein the transition time calculating section calculates the routing capability time based on a time required to set up connection to the external network or a time required to set up for a routing process.

13. A terminal comprising:
   a terminal receiving section for receiving a routing stop message indicating a routing stop time, as a time remaining until a stop of a routing function from a first router currently executing the routing function, and a routing capability message including a routing capability time calculated by a second router, the routing capability time being a time required to enable the routing function by a second router; and
   a router switch section for setting a time for switching a communication to be sent to an external network from the first router to the second router based on the routing capability time inside the routing capability message, wherein the routing capability time is determined in and transmitted from the second router and received by the terminal receiving section.

14. The terminal according to claim 13, wherein the switching by the router switch section occurs after a lapse of the routing stop time and a lapse of the routing capability time.

* * * * *